United States Patent
Gres et al.

(10) Patent No.: US 12,076,958 B2
(45) Date of Patent: Sep. 3, 2024

(54) MANUFACTURING PROCESS FOR PRODUCING HERMETIC SINGLE-USE FOOD CONTAINERS SUCH AS COFFEE PODS, INCLUDING A CREASING STEP

(71) Applicant: SOCIETE DES PRODUITS NESTLE S.A., Vevey (CH)

(72) Inventors: Nicolas Gres, Echenevex (FR); David Nordqvist, Echichens (CH); Christophe Sebastien Paul Heydel, Chez-le-Bart (CH)

(73) Assignee: Societe des Produits Nestle S.A., Vevey (CH)

( * ) Notice: Subject to any disclaimer, the term of this patent is extended or adjusted under 35 U.S.C. 154(b) by 88 days.

(21) Appl. No.: 17/415,038

(22) PCT Filed: Dec. 17, 2019

(86) PCT No.: PCT/EP2019/085486
§ 371 (c)(1),
(2) Date: Jun. 17, 2021

(87) PCT Pub. No.: WO2020/127147
PCT Pub. Date: Jun. 25, 2020

(65) Prior Publication Data
US 2022/0063227 A1 Mar. 3, 2022

(30) Foreign Application Priority Data
Dec. 19, 2018 (EP) ................................. 18213794

(51) Int. Cl.
*B31B 50/88* (2017.01)
*B31B 50/59* (2017.01)
(Continued)

(52) U.S. Cl.
CPC ............ *B31B 50/88* (2017.08); *B31B 50/592* (2018.05); *B31F 1/08* (2013.01); *B65B 29/025* (2017.08);
(Continued)

(58) Field of Classification Search
CPC ... B31B 50/88; B31B 50/592; B31B 2120/70; B31B 2120/10; B65B 29/025; B31F 1/08
(Continued)

(56) References Cited

U.S. PATENT DOCUMENTS

| 4,721,500 A | 1/1988 | Van Handel et al. |
| 5,230,939 A * | 7/1993 | Baum .................... A47G 19/03 |
| | | 428/167 |

(Continued)

FOREIGN PATENT DOCUMENTS

| CN | 1763313 | 4/2006 |
| CN | 103842167 A | 6/2014 |

(Continued)

OTHER PUBLICATIONS

Chile Office Action for Appl No. 202101424 dated Sep. 28, 2022.
(Continued)

*Primary Examiner* — Sameh Tawfik
(74) *Attorney, Agent, or Firm* — K&L Gates LLP

(57) ABSTRACT

A manufacturing process for producing hermetic single-use food containers includes: forming a 3D container body having a peripheral upper rim by stamping a 2D blank in a press, the 2D blank including a rim portion and a wall portion; applying a closing lid over the 3D container body and sealing the closing lid with the rim. The manufacturing process is characterized in that it comprises a creasing step before forming the 3D container body, where creases are formed in a peripheral zone of the 2D blank by creasing or embossing the 2D blank with a creasing or embossing plate,
(Continued)

the thus pre-creased peripheral zone covering at least a part of the rim portion of the 2D blank.

19 Claims, 2 Drawing Sheets

(51) Int. Cl.
    *B31F 1/08*     (2006.01)
    *B65B 29/02*     (2006.01)
    *B31B 120/10*     (2017.01)
    *B31B 120/70*     (2017.01)

(52) U.S. Cl.
    CPC ....... *B31B 2120/10* (2017.08); *B31B 2120/70* (2017.08)

(58) Field of Classification Search
    USPC .............................................. 93/102; 493/102
    See application file for complete search history.

(56) References Cited

U.S. PATENT DOCUMENTS

| | | | | |
|---|---|---|---|---|
| 5,326,020 A * | 7/1994 | Cheshire | ................ | A47G 19/03 |
| | | | | 229/407 |
| 6,093,460 A | 7/2000 | Iwaya | | |
| 7,914,432 B2 * | 3/2011 | Zelinski | ................ | B31B 50/592 |
| | | | | 271/211 |
| 8,464,871 B2 * | 6/2013 | Wnek | ..................... | B31B 50/26 |
| | | | | 229/407 |
| 9,555,916 B2 * | 1/2017 | Abayhan | ................ | A47G 19/03 |
| 10,022,932 B2 * | 7/2018 | Wnek | ................ | B65D 81/3453 |
| 10,368,668 B2 * | 8/2019 | Hyder | ................ | B65D 43/0208 |
| 2012/0118880 A1 | 5/2012 | Wnek | | |
| 2012/0118889 A1 | 5/2012 | Dunwoody | | |
| 2016/0207303 A1 * | 7/2016 | Nader | .................. | B31D 1/0081 |
| 2018/0362207 A1 * | 12/2018 | McMahon | ........ | B29C 66/73921 |
| 2022/0399567 A1 * | 12/2022 | Visco | .................. | H01M 50/437 |

FOREIGN PATENT DOCUMENTS

| | | |
|---|---|---|
| CN | 105916671 A | 8/2016 |
| EP | 1160379 | 12/2001 |
| EP | 2025605 | 2/2009 |
| FR | 2954289 | 6/2011 |
| JP | 2002179044 A | 6/2002 |
| JP | 2004106369 A | 4/2004 |
| JP | 2006103726 A | 4/2006 |
| JP | 2015040075 A | 3/2015 |

OTHER PUBLICATIONS

Chinese Office Action for Chinese Appl No. 201980084511.7 dated Nov. 26, 2022.

Japanese Office Action for Appl No. 2021-532475 dated Aug. 22, 2023.

* cited by examiner

MANUFACTURING PROCESS FOR PRODUCING HERMETIC SINGLE-USE FOOD CONTAINERS SUCH AS COFFEE PODS, INCLUDING A CREASING STEP

CROSS REFERENCE TO RELATED APPLICATIONS

The present application is a National Stage of International Application No. PCT/EP2019/085486, filed on Dec. 17, 2019, which claims priority to European Patent Application No. 18213794.3, filed on Dec. 19, 2018, the entire contents of which are being incorporated herein by reference.

FIELD OF THE INVENTION

The invention deals with containers, more particularly with single-use containers hermetically closed by a lid film or other top designed to minimize airflow or vapor flow into the container. Such containers are used for foodstuff, such as the coffee pods to be used in beverage system.

Single-use barrier plastic containers hermetically closed by a lid film are well known. Such containers usually include a container body having a sidewall or sidewalls and a rim extending outwardly from the top of the sidewall, and a lid film or analogous that closes the top of the container body by being sealed with the rim.

BACKGROUND OF THE INVENTION

Some known container bodies are made from a laminated material including a plastic barrier.

On the one hand, single-use plastic barrier containers already in the market exhibits good sealing between the container body and the closing lid thanks to plastic stretchability, which is around 600%: the rim of the plastic thermoformed/injected container body has a flat surface and a constant thickness. The sealing of the closing lid onto the rim of such container bodies is therefore strong.

On the other hand, consumers seek for more eco-friendly and environment-friendly packaging materials, with "natural" appealing aspects.

PLA laminate (like PLA/PVOH/PLA, where PLA means polylactic acid and PVOH means polyvinyl alcohol) is compostable, while paper provides a "natural" feeling. Therefore, a single-use container body made of Paper/PLA laminate would answer to consumers' concerns. The heat-sealing is done by the PLA plastic material.

Unfortunately, paper stretchability is around 10%. Thus, for container bodies made from such material with paper, when the flat paper is formed in a three-dimensional shape, wrinkles (up to 1 mm) appear at the surface of the container rim. Therefore, channels are created between the container body and the closing lid or between the layers of the paper-laminated material, when the closing lid is sealed on to the container body's rim. Such channels allow gas and vapor (moisture) to enter the container, which is detrimental to the quality of the ingredient contained therein, after storage periods. During heat-sealing with usual heat-sealing heads, the wrinkles remain in some extend and sealing is not ensured in the wrinkles. Thus, even though a partially effective seal may be created, the container contents are nonetheless exposed to some amount of external air and moisture seeping through these wrinkles. This in turn accelerates the spoiling of the container's contents. Oxygen and vapor barrier properties in the rim are insufficiently obtained.

A solution is to add a plastic rim to ensure smooth and regular rim surface. Such containers with encapsulated rim features are disclosed by EP1485178. Indeed, EP1485178 proposes various container bodies having fully or partially-encapsulated rim or flange. The encapsulating material is generally made of a plastic such as polyolefin, nylon, polyethylene terepthalate, polycarbonate, or other engineering thermoplastic resins. This encapsulating material covers at least a portion of the rim or flange and may extend a distance from the rim's outer edge. The exterior of the encapsulating material is substantially smooth, even those portions filling or overlying irregularities in the rim. Further, the encapsulated rim presents a hermetic barrier to gases and moisture, and may be sealed with a film or other material to completely insulate the container interior.

But the polymer used for the encapsulation is expensive and the amount used increases the cycle time required to form useful container bodies. Besides, the manufacturing process becomes complex.

To reduce the impact of the encapsulating of the rim on manufacturing costs and time, EP1485178 proposes to reduce the amount of polymer by encapsulating only a portion of the rim or flange. For example, only the underside of the rim is covered with the encapsulating material. By injecting resin only on the under or backside of the rim during the injection-molded process, the exposed paperboard pleats on the upper surface of the rim are pressed upwardly against a surface of the metal mold by the hot, high-pressure injectant, which compresses or "irons" the pleats on the upper surface of the flange. This creates an improved sealing surface on the upper side that helps ensuring that a hermetic seal is obtained across the now-flattened pleats. Moreover, the smooth surface of the encapsulated underside of the rim can also be bound to the closing lid while this latter is bent downwardly.

Nevertheless this solution still uses encapsulating material and injection of this material into a mold. So the manufacturing costs and time are reduced but only in a quite low extend. Besides, this solution does not come up to the consumers' expectations for more natural products.

Another solution that is disclosed in Billerud's WO 2015/082268 patent application, wherein the wrinkles created by the three-dimensional deformation of the paper layer of the container body, are reclosed by spraying or otherwise coating a material to "fill" the wrinkles before the top lid is sealed thereto. This solution has the drawback that it requires an additional component to the structure of the pod (i.e. the rim coating material) and also an additional spraying step and equipment which adds cost and complexity to the process.

Consequently, a need exists to develop a method for ensuring proper sealing of Paper/PLA laminates, that uses current manufacturing technologies and that does not add any additional container element.

SUMMARY OF THE INVENTION

An object of the present invention is to provide a simpler and cost-saving manufacturing process for producing hermetic single-use food containers such as coffee pods. In particular, the object of the invention is to avoid the need for encapsulating, even partially, the rim of the pod.

The manufacturing method of the present invention also aims to obtain an efficient sealing on the rim of single-use food containers to ensure in-cup quality and adequate shelf-life through adequate oxygen and vapor barrier properties, even with a container body made from paper/PLA laminate.

In other words, an object of the invention is to provide a new nature-friendly pod with no encapsulated rim feature but which is at least as hermetic as the prior pods having encapsulated rim features.

To this end, the manufacturing process for producing hermetic single-use food containers according to the invention includes:
- forming a 3D container body having a peripheral upper rim, by stamping a 2D blank in a press, the 2D blank including a rim portion and a wall portion,
- applying a closing lid over the container body,
- sealing the closing lid with the rim of the container body, for example by applying a first die and a second die of a sealing head one against the other. The sealing can be heat-sealing or ultrasonic-sealing or induction sealing for example.

It is to be noted that the "rim portion" of the 2D blank refers to the outer part of the 2D blank that will form the rim of the 3D container after the forming step. Likewise, the "wall portion" of the 2D blank refers to the central part of the blank that will form the sidewall(s) and the bottom of the 3D container after the forming step.

The process according to the invention is characterized in that it comprises a creasing step before forming the container body, where creases are formed in a peripheral zone of the 2D blank by creasing, stamping or embossing the 2D blank with a creasing or embossing plate, this peripheral zone covering at least a part of the rim portion. Creasing can be macro-, or micro-creasing. The peripheral zone where the creases are formed is here after called the "pre-creased peripheral zone". Such techniques of creasing, stamping, or embossing are known as such and will not be described herein in further details.

In other words, the invention essentially consists in pre-creasing the 2D blank in a zone (the pre-creased peripheral zone) where wrinkles appear at forming the 3D container body. These wrinkles are then reduced, compensated, and even almost "canceled", by the creases when stamping the 2D blank to form the 3D container body.

Creasing is a well-known technology, easy to execute with simple tools at small costs. So far, this technology was applied to packaging paperboard to create folding lines. This technology is here used in another purpose, at an early step of a manufacturing process for producing hermetic single-use food containers, in order to enhance the ability for the container to protect its content from oxygen and vapor from the environment. The creasing step can be executed using flat-bed, or otherwise rotary equipment: the 2D blank is pushed by a creasing rule into an accurately cut groove in a counter-die on which the 2D blank is located. Interestingly, the creasing (or otherwise stamping or embossing) step can be carried out simultaneously with the die-cutting of the flat blank that will be used for forming the future container body. This represents an advantage in that it does not add substantial cost or complexity to the industrial process.

In preferred embodiments, the manufacturing process according to the invention also includes one or several of the following features.

The 2D blank is a disc; and the container body and the rim have a circular section.

The creases formed on the 2D blank are rectilinear. As an alternative, the creases look like waves.

Although it is possible to provide the 2D blank with creases following circumferential directions, at least some of the creases formed in the peripheral zone preferentially follow centrifugal directions of the 2D blank. For example, in case where the 2D blank is a disc and the creases are rectilinear, the creases follow radii of the disc.

In a first version, the creases are only formed on a part of the rim portion of the 2D blank, for example from an outer edge of the rim portion.

Alternatively, the pre-creased peripheral zone covers the whole rim portion of the 2D blank. For example, each crease or at least some of them extend along the entire width of the rim portion, from an outer edge till an inner edge of the rim portion. As another example, the rim portion can have creases extending from the outer edge of the rim portion along an outer part of the width of the rim portion and other creases extending from the inner edge of the rim portion along an inner part of the rim portion (in other words, there are creases on the entire width of the rim portion but the creases are not continue from the outer edge till the inner edge of the rim portion).

The pre-creased peripheral zone can be limited to the rim portion that is to say that there is no crease outside of the rim portion.

As an alternative, some creases are also formed in the wall portion of the 2D blank. In other words, the pre-creased peripheral zone covers, not only at least a part of the rim portion, but also at least a part of the wall portion of the 2D blank, preferably a part of the wall portion extending from the inner edge of the rim portion.

For example, at least some of the creases formed in the rim portion continue in the wall portion beyond the inner edge of the rim portion toward a center of the 2D blank. In addition or as an alternative, a first crease in the rim portion can be extended in the wall portion with a second crease having another form than the first crease (for example, the second crease is formed in the other side of the 2D blank, or the second crease has a different width from the first crease, etc.).

The pre-creased peripheral zone has a width comprised between 5 mm and 20 mm for a 2D blank having a diameter or a diagonal (in case, for example, where the body container and the rim have a rectangular or squared section) comprised between 60 mm and 80 mm.

In a first preferred embodiment, the 2D blank is a disc and has a diameter comprised between 10 mm and 100 mm, preferably between 40 mm and 80 mm, more preferably a diameter of 68 mm or 73 mm; the rim has a width of between 6 mm to 12 mm, and the pre-creased peripheral zone also has a width comprised between 6 mm and 12 mm.

In a second preferred embodiment, the 2D blank is a disc and has a diameter comprised between 10 mm and 100 mm, preferably between 40 mm and 80 mm, more preferably a diameter of 68 mm or 73 mm; the rim has a width of about 7 mm and the pre-creased peripheral zone has a width of about 15 mm including the 7 mm of the rim portion (that is to say that the pre-creased peripheral portion also extend in the wall portion on about 8 mm).

The creases are formed only on a first side of the 2D blank.

As an alternative, creases are formed on both sides of the 2D blank. For example, the creases are alternately formed on both sides of the 2D blank, that is to say that a crease formed on a first side of the 2D blank is followed by a crease formed on the second side of the 2D blank, such that each side of the 2D blank shows a succession of "positive" (hollow) crease and "negative" (in relief) crease along the peripheral zone; in other words, the peripheral zone is a kind of accordion creased zone.

The 2D blank can have a thickness comprised between 100 microns and 500 microns, preferably between 150 μm and 300 μm, more preferably between 200 μm and 210 μm.

The creases have a depth comprised between 0.1 mm and 1 mm, preferably between 0.5 mm and 1 mm.

The creases have a width comprised between 0.1 mm and 0.7 mm, preferably between 0.2 mm et 0.7 mm, more preferably between 0.5 mm and 0.7 mm.

The creases are oriented along radial directions of the pod, and are spaced apart with a pitch comprised between 0.2 mm and 2 mm measured at the inner edge of the rim portion, the pitch being the distance (dimension of the rectilinear segment) between the intersection of a crease with the inner edge of the rim and the intersection of the following crease with the inner edge. This allows achieving a pre-creasing density in the rim region of the pod which cancels or at least sufficiently reduces creases during forming, so that the rim portion of the pod is substantially deprived of channels or wrinkles, thereby allowing efficient sealing of the closing lid. The creases are generally linear and directed radially relative to the diameter of the flat blank (and subsequent formed container body) from one end to another, but any shape can occur, such as waves, curves and the like.

Preferably, the creasing or embossing plate used to form the creases according to the invention is heated at a temperature comprised between 30° C. and 150° C. This facilitates deformation of the material, without rupturing or otherwise damaging the fibers or the structure of the material.

According to a possible feature of the invention, the forming step of the 2D blank into a 3D container body comprises wetting and/or pre-heating the rim portion with a wetted and/or heated forming cavity, punch or plate. This causes softening of the material prior to the deformation and prevents damaging the material during deformation.

Preferably, the 2D blank used according to the invention is made from a sheet of paper/PLA laminate such as a sheet of paper/PLA/PVOH/PLA, where PLA means polylactic acid and PVOH means polyvinyl alcohol.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
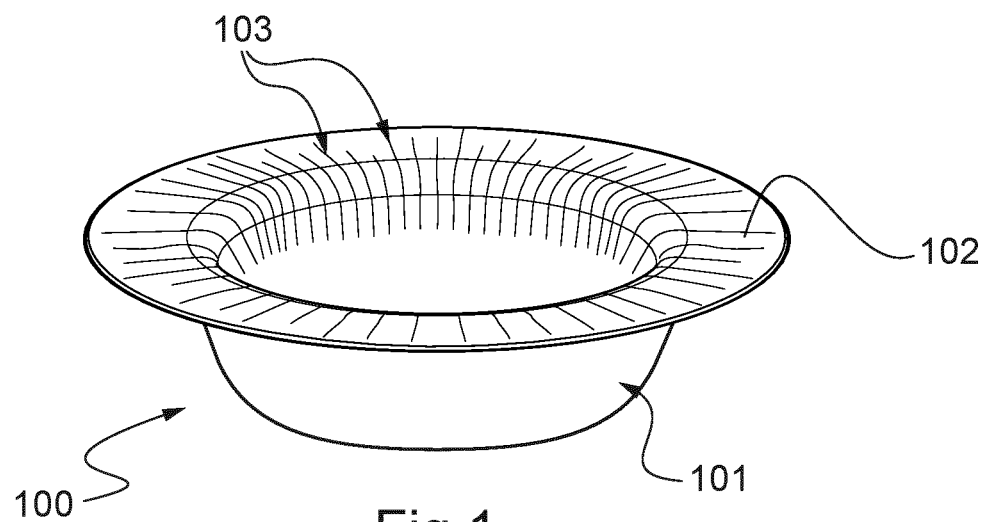
FIG. 1 is a schematic view in perspective of a 3D container body of the prior art.

As shown at FIG. 1, a 3D container body 100 of the prior art exhibit wrinkles 103 that appears essentially on the rim 102 or at the junction between the rim 102 and the sidewall 101 of the 3D container body. To close the container body, a closing lid (not shown) is sealed on the rim 102 after the container body 100 has been filled with food. The wrinkles 103 compromise the perfect sealing of the closing lid with the rim and a hermetic seal cannot be obtained.

In the manufacturing process according to the invention as well as in prior processes, in a first step, a 2D blank is obtained by cutting a sheet of a suitable material for producing a hermetic single-use food container, for example a sheet of Paper/PLA laminate (of course, the invention also applies to a sheet of material having a plastic barrier). In the non-limiting illustrated examples, the 2D blank is a disc cut in the sheet, whose diameter can be of about 68 mm or 73 mm.

The 2D blank has a peripheral rim portion 11 which is intended to become the rim 31 of the final pod (see FIG. 4), and a central wall portion 12 which is intended to become the sidewall and bottom 32 of the pod.

Next, according to the invention (but not in prior processes), a pre-creasing process is implemented on the 2D blank with a usual creasing or embossing plate (not shown) so as to create creases in a peripheral zone.

As mentioned previously, in one embodiment, the two steps of blank cutting, and pre-creasing can be performed simultaneously.

Figure 2:
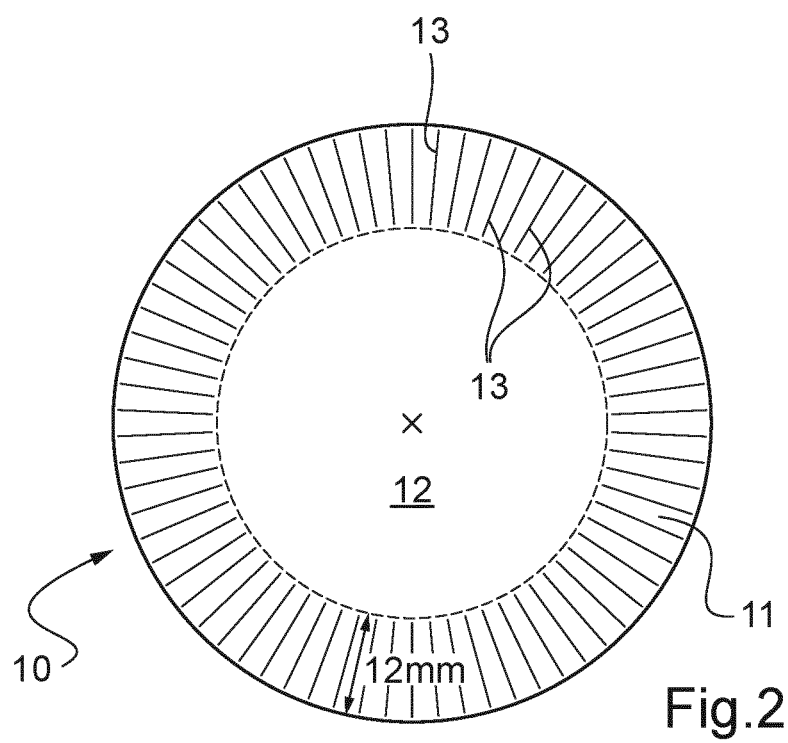
FIG. 2 is a schematic top view of a first embodiment of a 2D blank according to the invention.
Figure 3:
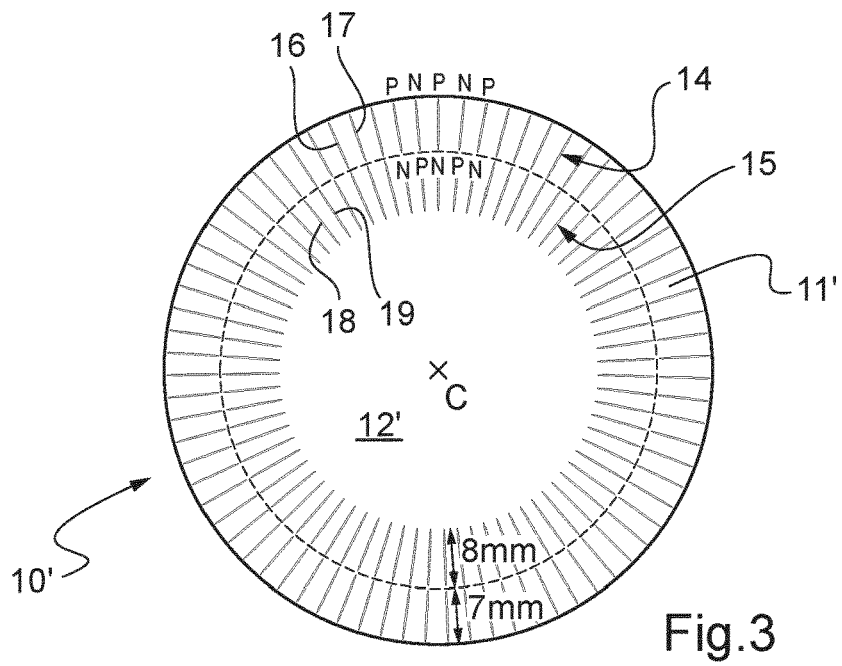
FIG. 3 is a schematic top view of a second embodiment of a 2D blank according to the invention.

FIG. 2 and FIG. 3 show two examples of pre-creased 2D blank according to the invention. The pre-creased 2D blank 10 at FIG. 2 has a rim portion 11 having a width of about 12 mm and it has creases extending radially all around the rim portion 11 on the entire width of the rim portion. In this embodiment, the creases 13 stop at the inner edge of the rim portion 11 and the wall portion 12 is devoid of creases. The creases 13 are formed all around the rim such that the pre-creased 2D blank 10 is rotationally symmetrical.

The pre-creased 2D blank 10' at FIG. 3 has a rim portion 11' of 7 mm width and two series of creases all around the blank: a first series of creases 14 that extend radially on the entire width of the rim portion 11'; and a second series of creases 15 extending radially in the wall portion 12' of the 2D blank from the inner edge of the rim portion (that is to say from the junction between the rim portion and the wall portion) on a length of about 8 mm, whereby the creases of the second series do not extend until the centre of the blank. Each crease (18) of the second series is in the extension of a crease (16) of the first series and vice versa. As a variant, the creases in the wall portion can be offset (in quincunx) from the creases in the rim portion.

The creases 13 made in the 2D blank 10 at FIG. 2 are all formed in a first face of the blank.

As a variant, the creases made in the 2D blank 10' at FIG. 3 are alternately formed in the two opposite faces of the blank, whereby a succession of hollows and bumps appears along a circumferential direction at the periphery of the 2D blank. At FIG. 3, hollows are referenced P (for positive crease) and bumps are referenced N (for negative crease). This alternation along the circumferential direction causes a greater amplitude in deformation of the flat blank and therefore an easier and more efficient effect on preventing future formation of wrinkles.

Besides a hollow 16 in the rim portion can be extended by a bump 18 in the wall portion, whereas a bump 17 in the rim portion is extended by a hollow 19 in the wall portion. In other words, an alternation between hollows and bumps is also provided along the radial directions.

In these non-limiting examples, the creases 13 and 16-19 have a width of about 0.5 to 0.7 mm and a depth of about 0.7 mm.

Figure 4:
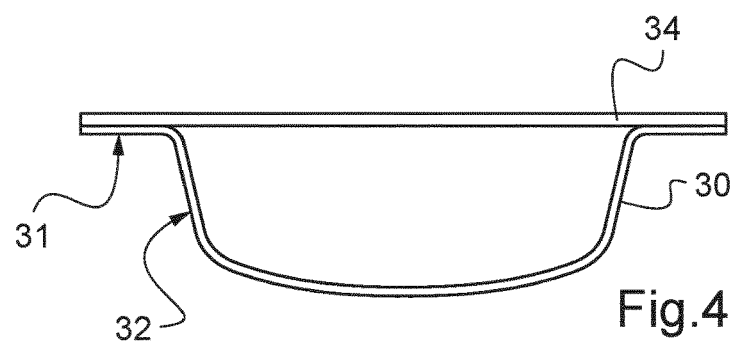
FIG. 4 is a schematic cross section of a hermetic single-used food container, here a pod, according to the invention.

Next a 3D container such as the one (referenced 30) shown at FIG. 4 is formed using a known forming process. The forming process can be chosen from known sliding blank processes (where the sliding of the blank into the mould and the lateral contraction of the blank cause the micro-folding of the blank) such as stamping processes or deep-drawing processes, or from known fixed blank processes (where the container is formed essentially via straining of the blank) such as air forming/vacuum forming processes and hot pressing processes, depending on the desired shape (in particular the desired depth) for the 3D container, the material of the blank, etc.

Figure 5:
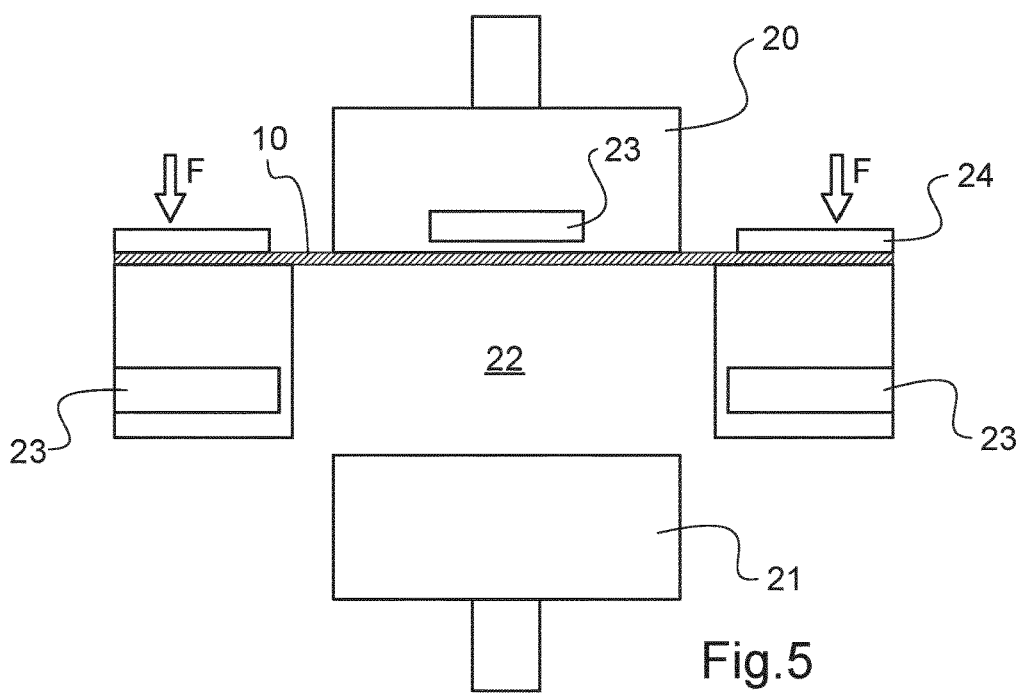
FIG. 5 is a schematic cross section of a usual forming device for forming a 3D container body from a 2D blank.

A preferred process is nevertheless the deep-drawing process as it causes limited wrinkles compared with other forming processes. The forming of the 3D container by deep-drawing can be carried on with a press as illustrated at FIG. 5, comprising a male die 20 while the female mould can be absent, present as a counter holder 21 as illustrated or used to emboss the under of the shape. The 2D blank is placed into the forming machine where it is clamped by a blank holder 24 with a predetermined force F; subsequently, the male die 20 starts a downward movement towards the counter holder 21 along a forming cavity 22, which is where the actual forming occurs. Finally, the shape is released from the forming device. The forming cavity is preferably surrounded by heating elements 23. Heating elements can also be provided in the male die 20.

The whole forming sequence can be as short as a couple of seconds. The selection of forming parameters such as the die force, the blank holding force F, the forming gap or clearance (which is the lateral distance between the edge of the forming cavity and the edge of the male die) is performed empirically.

As to the forming gap, it can be noted that this distance is varied, among others, according to the thickness of the material from which the blank is made. Too small a forming gap increases the out-of-plane and in-plane shear and forces. This can lead to the formation of cracks and eventual failure of material in the formed shape. Typically, the gap is around 0.7 times the thickness of the paperboard". On the other hand, too large a forming gap leads to the poor appearance of the shape and to significant wrinkles that create voids which restrict the possibility of gas-tight sealing of such shapes. The wrinkles 103 that normally appear in (prior) 3D containers during the forming step are here compensated by the creases formed in the 2D blank according to the invention.

Next, a closing lid 34 (see FIG. 4) is sealed to the obtained container body 30, using a known heat or ultrasonic or induction sealing head. In this step, a peripheral strip of the lid is sealed to the rim 31 of the container body. The sealing is here hermetic since the rim has no wrinkles. It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A manufacturing process for producing hermetic single-use food containers, comprising:
   forming a 3D container body having a peripheral upper rim, by stamping a 2D blank in a press, the 2D blank including a rim portion and a wall portion, the 2D blank comprises a sheet of laminate of paper and polylactic acid (PLA),
   applying a closing lid over the 3D container body,
   sealing the closing lid with the peripheral upper rim of the 3D container body, and
   a creasing step before forming the 3D container body, where creases are formed in a peripheral zone of the 2D blank, here referred to as a pre-creased peripheral zone, by creasing, stamping or embossing the 2D blank with a creasing or embossing plate, which pre-creased peripheral zone covers at least a part of the rim portion of the 2D blank, wherein the creases have a depth comprised between 0.1 mm and 1 mm, and a width comprised between 0.2 mm and 0.7 mm, and in that they are spaced apart with a pitch comprised between 0.2 mm and 2 mm.

2. The manufacturing process according to claim 1, wherein the creases follow centrifugal directions of the 2D blank.

3. The manufacturing process according to claim 2 wherein the 2D blank is a disc, and the creases are rectilinear and follow radii of the disc.

4. The manufacturing process according to claim 1, wherein the pre-creased peripheral zone covers the whole rim portion of the 2D blank.

5. The manufacturing process according to claim 4, wherein at least some of the creases extend from an outer edge of the rim portion till an inner edge of the rim portion, through an entire width of the rim portion.

6. The manufacturing process according to claim 1, wherein the pre-creased peripheral zone also covers a part of the wall portion of the 2D blank.

7. The manufacturing process according to claim 6, wherein at least some of the creases formed in the rim portion continue in the wall portion beyond an inner edge of the rim portion toward a center of the 2D blank.

8. The manufacturing process according to claim 6, wherein at a first crease in the rim portion is extended in the wall portion with a second crease having another form than the first crease.

9. The manufacturing process according to claim 1, wherein the 2D blank has a diameter or a diagonal comprised between 10 mm and 100 mm, wherein the pre-creased peripheral zone has a width comprised between 5 mm and 20 mm.

10. The manufacturing process according to claim 1, wherein the creases are formed only on a first side of the 2D blank.

11. The manufacturing process according to claim 1, wherein a first portion of the creases are formed on a first side of the 2D blank, while a second portion of the creases are formed on a second side of the 2D blank, the second side opposite the first side.

12. The manufacturing process according to claim 11, wherein the creases are alternately formed on both sides of the 2D blank, a crease formed on a first side of the 2D blank being followed by a crease formed on a second side of the 2D blank.

13. The manufacturing process according to claim 1, wherein the creasing or embossing plate is heated at a temperature comprised between 30° ° C. and 150° C.

14. The manufacturing process according to claim 1, wherein the forming step of the 2D blank into a 3D container body comprises wetting and/or heating the rim portion with a wetted and/or heated forming cavity, punch or plate.

15. The manufacturing process according to claim 1, wherein the creases are formed without rupturing or damaging fibers or structure of the laminate of paper and PLA.

16. The manufacturing process according to claim 1, wherein the sealing of the closing lid with the upper rim of the 3D container body is a heat-sealing, an ultrasonic-sealing or induction sealing.

17. The manufacturing process according to claim 1, wherein a depth of the creases is decreased when the 2D blank is formed into the 3D container body.

18. The manufacturing process according to claim 1, wherein a PLA portion of the laminate of paper and PLA seals the upper rim of the 3D container body with the closing lid.

19. The manufacturing process according to claim 1, wherein the creasing step includes a simultaneous cutting step wherein the 2D blank is cut from the sheet of the laminate of paper and PLA.

\* \* \* \* \*